Oct. 23, 1956
D. W. ORMES
2,767,554
PURGING SYSTEM FOR REFRIGERANT
Filed April 10, 1953
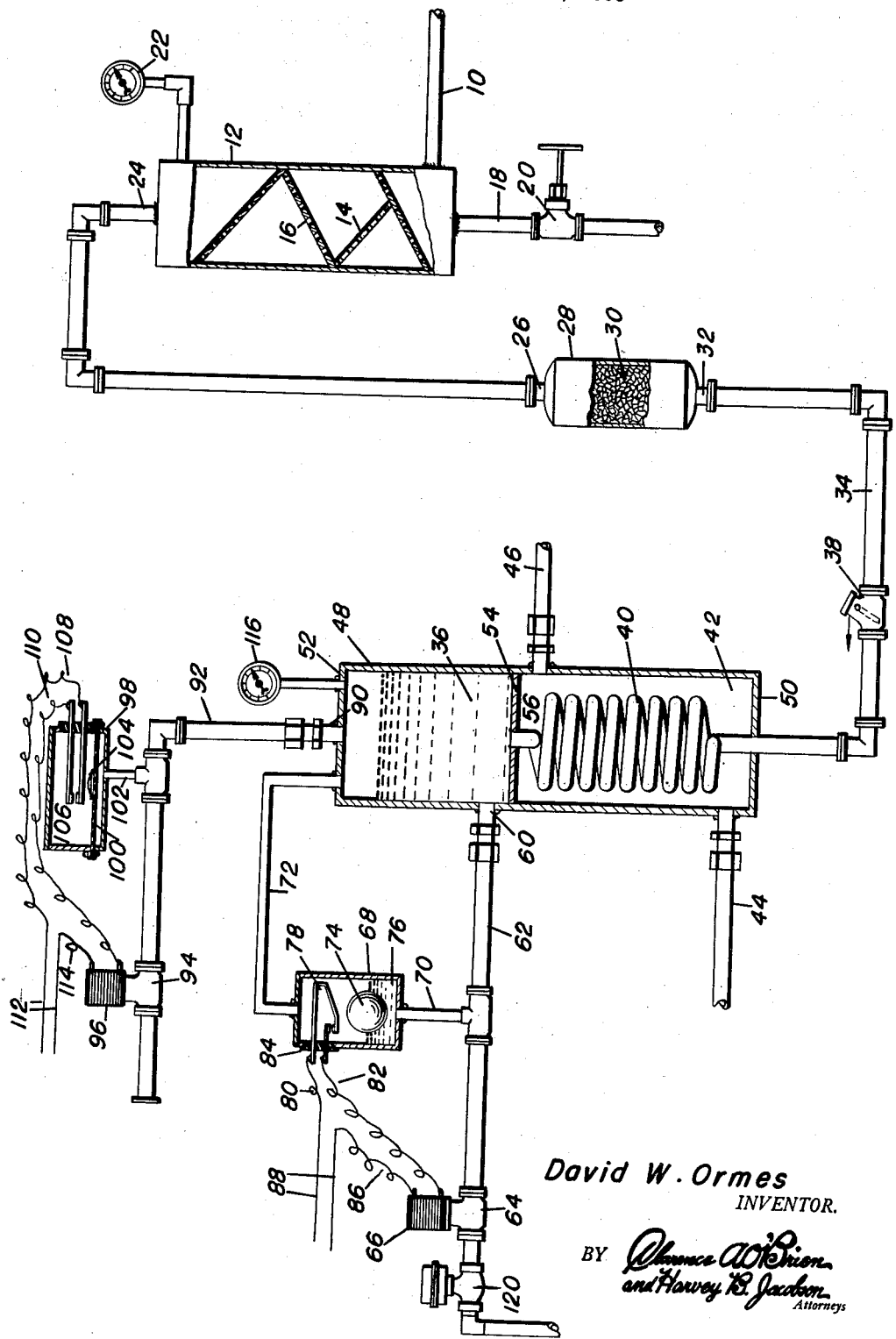
David W. Ormes
INVENTOR.
BY *[signatures]*
Attorneys United States Patent Office 2,767,554
Patented Oct. 23, 1956

2,767,554

PURGING SYSTEM FOR REFRIGERANT

David W. Ormes, Detroit, Mich.

Application April 10, 1953, Serial No. 347,888

12 Claims. (Cl. 62—2)

This invention relates to a refrigerant purging system and particularly to a system for removing the impurities from the vaporizable refrigerant in a refrigerant system.

In the operation of refrigerating systems various types of impurities become entrained in the refrigerating system and decrease the efficiency of operation thereof. Frequently non-condensible gases either leak into the system or are generated therein so that the pumping capacity is materially reduced because of the presence of the non-condensible gases. Further lubricants and other oils may be entrained in the system and flow therethrough so that the volume of material which can be evaporated is somewhat reduced, thereby reducing the efficiency of the plant. In certain types of refrigerants water may also be present which likewise reduces the refrigerating capacity of the system.

The present invention provides a system for removing these contaminations from the refrigerant which not only increases the efficiency of the refrigerating system but prevents the combination of the impurities with the refrigerant and possible damage because of chemical reactions therein.

In the system according to the present invention a connection is made to a high pressure gaseous phase of the refrigerator and the high pressure gas bled off and passed through an oil removing system after which the high pressure gases are dehydrated by passing through a desiccant material and then the refrigerant materials are passed through a cold chamber and refrigerated to the condensing point so that the refrigerant is reduced to a liquid while the non-condensing gases remain in gaseous state. This material is then introduced into a separator where gravity separation occurs so that the liquid refrigerant remains in the bottom of a separator container and the non-condensing gases elevated or raised to the top thereof. A float responsive valve is utilized to open a conduit which drains the liquid refrigerant in the separator container to a low pressure phase of the refrigerating system. Also the separator container is provided with a gas outlet port which is normally controlled by a closed valve and pressure responsive means are provided so that when the pressure in the separator container rises above the atmospheric pressure the non-condensing gases will be vented through the control valve to the atmosphere so that the non-condensing gases will be separated out and removed from the refrigerant system.

It is accordingly an object of the invention to provide an improved refrigerant purging system.

It is a further object of the invention to provide an improved separator for the refrigerant purging system.

It is a further object of the invention to provide a separator with means for discharging the non-condensing gases to the atmosphere.

It is a further object of the invention to provide a purging system which will return the cleaned refrigerant material to the refrigerating system.

Other objects and many of the attendant advantages of the present invention will be apparent from the following detailed description taken in conjunction with the accompanying drawing in which the figure is a schematic illustration of a purging system according to the invention.

In the exemplary embodiment according to the invention, a conduit 10 is adapted to be connected to a high pressure vapor stage point in a refrigerating system (not shown). The conduit 10 opens into a first chamber which may be of any convenient size and is provided with a plurality of baffles 14 which are arranged transverse to the flow of gas through the container 12 and are preferably provided with apertures 16 to break up and disturb the flow of gaseous material through the container and provide large surfaces on which the droplets of oil or other liquid in the gases may be impinged and be separated out from the gases. A drain conduit 18 is communicated to the bottom of the container 12 and is preferably provided with a control valve 20 so that the valve may be opened to drain out any accumulation of oil or other liquids which may be separated from the gaseous material. Preferably a pressure meter 22 is communicated with the interior of the chamber 12 so that the pressure of the gases delivered to the purging system may be determined.

A tubular outlet port 24 of the container 12 is connected to a tubular inlet port 26 of a container 28 which is preferably filled with a suitable desiccant material 30 to absorb any water or water vapor contained in the gases. Outlet port 32 of the desiccant chamber 28 is connected by means of a conduit 34 to a separating chamber 36. A check valve 38 is provided in the conduit 34 to prevent any possible back flow of refrigerant material or gases from the separator chamber 36.

A portion of a conduit 34 is provided in the form of a worm 40 which is preferably placed within a container 42 into which a refrigerant material may be introduced by means of a conduit 44 and removed by means of a conduit 46. The refrigerant material may be of any suitable type such as strongly cooled brine or any expanded refrigerant material which will readily withdraw heat from thhe coil 40 and the material contained therein.

For simplicity of construction the chambers 42 and 36 are constructed as portions of the same integral container 48 having a bottom 50 and a top 52 with a solid partition 54 intermediate the ends thereof. The portion of the conduit 34 forming the coil 40 is contained within the portion 42 of the container and the upper end 56 of the conduit 34 is sealed into the partition 54 so that the conduit 34 discharges into the chamber 36. An outlet port 60 is provided adjacent the bottom of the container 36 and is connected by means of a conduit 62 to a low pressure portion of the refrigerating system (not shown). A gate valve 64 is provided in the conduit 62 and an actuating member in the form of a solenoid 66 is supplied 66 is supplied therefor. A float chamber 68 is communicated with the conduit 62 by means of a conduit 70 and the upper end of the float chamber 68 is communicated with the top of the separating chamber 36 by means of a conduit 72. The float 74 is arranged in the chamber 68 so that as the liquid rises in the chamber 36 the float 74 will be actuated in a calm substantially quiet quantity of liquid 76. A switch 78 is mounted in the chamber 68 to be energized by means of the float 74 which is preferably of an insulating material so that there will be no grounding of the switch element through the float 74. Conductors 80 and 82 are connected to the switch 78 and are led into the chamber 68 by means of a suitable insulating bushing 84. A conductor 80 and a conductor 86 are connected to a suitable supply line 88 so that the energization of the solenoid 66 is controlled by means of the switch 78.

A gas outlet port 90 is placed in the upper end of the chamber 36 and is connected by means of a conduit 92 to atmosphere. A gate valve 94 controls the passage of gas through the conduit 92 and the gate valve 94 has an operating device in the form of a solenoid 96. The pressure responsive switch comprises a chamber 98 having a diaphragm 100 therein. The portion of the chamber 96 below the diaphragm 100 is communicated with the conduit 92 by means of a conduit 102. Actuating button 104 is placed on the diaphragm 100 and operates to close the contacts of the switch 106. Switch 106 is connected to the conductor 108 and a conductor 110 with the conductor 110 being connected to the solenoid 96 and the conductor 108 being connected to one side of the supply line 112. The other side of the supply line 112 is connected to the solenoid 96 by conductor 114.

Preferably a pressure gauge 116 is communicated with the chamber 36 so that the pressure available in the chamber 36 may readily be determined.

In the operation of the system according to the invention high pressure gases with the contaminations therein will be bled from the system by the conduit 10 and passed through the chamber 12 where the droplets of oil or other such liquid will impinge against the baffles 14 so that the oil will be retained and separated out. The gases will continue to flow on through the conduit 24 into the chamber 28 where the desiccant material 30 will absorb the moisture in the refrigerant gas which will continue on through the conduit 34 into the portion 40 thereof where the cooling effect of the refrigerant in the chamber 42 will condense the gaseous refrigerant to a liquid which will then flow into the separating chamber 36. The liquids will remain in the bottom of the container 36 while the non-condensing gases or impurities will rise to the top of the chamber. As the pressure within the container 36 increases to a point that it is above the atmospheric pressure, the pressure will cause the diaphragm 100 to rise closing the contacts of the switch 106 and energizing the solenoid 96 to open the valve 94 and vent the non-condensing gases to atmosphere.

While the liquid in the container 36 may rise in a more or less turbulent or agitated condition the liquid will be measured in the container 68 in a quite calm condition so that the float 76 will respond to the liquid level in the container 36. When the liquid in the container 36 has reached a predetermined level the float 74 will close the switch 78 energizing the solenoid 66 and opening the valve 64. In order to properly operate the valve 64 a pressure regulator valve 120 is placed between the valve 64 and the low pressure section of the refrigerator. Obviously, the pressure maintained by the valve 120 must be materially below the operating pressure for the valve 94 so that the liquid may be drained out without cocking the valve 94 and reducing the pressure in the container. When the valve 64 is open liquid will drain through the valve 64 and 120 until the pressure in the container 36 is below the pressure maintained by the valve 120 and at which time the valve 120 will close off the system.

It will thus be apparent that the present system provides a convenient means for disposing of the various contaminations in the refrigerant so that the oil and such like may be trapped and drained away by means of the conduit 18 and the control valve 20 while the water will be retained in the desiccant material 30 and the non-compressible gases will be vented to air through the valve 94 while the reconditioned and purified refrigerant materials will be returned to the refrigerating system through the float operated valve 64 and the pressure maintaining valve 120.

While for purpose of exemplification a particular embodiment of the invention has been shown and described according to the best present understanding thereof, it will be apparent to those skilled in the art, that many changes and modifications may be in the construction and arrangement of the parts thereof without departing from the true spirit and scope of the invention.

What is claimed as new is as follows:

1. A refrigerant purging system comprising an oil collecting chamber, a desiccant containing chamber and a gas separating chamber, a pressure responsive valve connected adjacent the top of said separating chamber, said valve operating in response to a predetermined pressure in said separator to vent said separator, a liquid level responsive valve connected to said separator, said chambers being interconnected in series relation.

2. A refrigerant purging system comprising a plurality of sequentially arranged and serially interconnected treating chambers, means for serially passing gaseous refrigerant sequentially through said chambers, the first of said chambers including a plurality of baffles arranged transversely to the flow of gaseous material therethrough, the second of said chambers connected to receive the gaseous material passed through said first chamber, a quantity of desiccant material in said second chamber, and a separating chamber connected to receive the material passed through said second chamber, means for liquifying the refrigerant passing from said second chamber to said separating chamber, a liquid outlet port in said separating chamber, a gas outlet port in said separating chamber.

3. A refrigerant purging system comprising a plurality of sequentially arranged and serially interconnected treating chambers, means for serially passing gaseous refrigerant through said chambers in series relation, the first of said chambers including a plurality of baffles arranged transversely to the flow of gaseous material therethrough, the second of said chambers connected to receive the gaseous material passed through said first chamber, a quantity of desiccant material in said second chamber, and a separating chamber connected to receive the material passed through said second chamber, means for liquifying the refrigerant passing from said second chamber to said separating chamber, a liquid outlet port in said separating chamber, a gas outlet port in said separating chamber, a pressure responsive valve for controlling discharge through said gas outlet port.

4. A refrigerant purging system comprising a plurality of sequentially arranged and serially interconnected treating chambers, means for serially passing gaseous refrigerant through said chambers in series relation, the first of said chambers including a plurality of baffles arranged transversely to the flow of gaseous material therethrough, the second of said chambers connected to receive the gaseous material passed through said first chamber, a quantity of desiccant material in said second chamber, and a separating chamber connected to receive the material passed through said second chamber, means for liquifying the refrigerant passing from said second chamber to said separating chamber, a liquid outlet port in said separating chamber, a gas outlet port in said separating chamber, a depth responsive valve in said liquid outlet port being responsive to the depth of liquid in the separating chamber.

5. A refrigerant purging system comprising a plurality of sequentially arranged and serially interconnected treating chambers, means for serially passing gaseous refrigerant sequentially through said chambers, the first of said chambers including a plurality of baffles arranged transversely to the flow of gaseous material therethrough, the second of said chambers connected to receive the gaseous material passed through said first chamber, a quantity of desiccant material in said second chamber, and a separating chamber connected to receive the material passed through said second chamber, means for liquifying the refrigerant passing from said second chamber to said separating chamber, a liquid outlet port in the lower portion of said separating chamber, liquid level responsive valve controlling said liquid outlet port, said valve being responsive to the liquid level in the separating chamber for controlling the liquid level therein.

6. A refrigerant purging system comprising a plurality of sequentially arranged and serially interconnected treating chambers, means for serially passing gaseous refrigerant sequentially through said chambers, the first of said chambers including a plurality of baffles arranged transversely to the flow of gaseous material therethrough, the second of said chambers connected to receive the gaseous material passed through said first chamber, a quantity of desiccant material in said second chamber, and a separating chamber connected to receive the material passed through said second chamber, means for liquifying the refrigerant passing from said second chamber to said separating chamber, a liquid outlet port in the lower portion of said separating chamber, liquid level responsive valve controlling discharge through said liquid outlet port, a gas outlet port in the upper portion of said separating chamber, a pressure responsive valve controlling discharge through said gas outlet port.

7. A refrigerant purging system comprising a plurality of sequentially arranged and serially interconnected treating chambers, means for serially passing gaseous refrigerant through said chambers in series relation, the first of said chambers including a plurality of baffles arranged transversely to the flow of gaseous material therethrough, the second of said chambers connected to receive the gaseous material passed through said first chamber, a quantity of desiccant material in said second chamber, and a separating chamber connected to receive the material passed through said second chamber, means for liquifying the refrigerant passing from said second chamber to said separating chamber, a liquid outlet port in the lower portion of said separating chamber, an outlet conduit connected to said outlet port, a solenoid valve in said conduit, and a liquid level responsive switch responsive to the liquid level in the separating chamber controlling the energization of said solenoid valve.

8. A refrigerant purging system comprising a plurality of sequentially arranged and serially interconnected treating chambers, means for serially passing gaseous refrigerant through said chambers in series relation, the first of said chambers including a plurality of baffles arranged transversely to the flow of gaseous material therethrough, the second of said chambers connected to receive the gaseous material passed through said first chamber, a quantity of desiccant material in said second chamber, and a separating chamber connected to receive the material passed through said second chamber, means for liquifying the refrigerant passing from said second chamber to said separating chamber, a liquid outlet port in the lower portion of said separating chamber, a conduit communicating with said outlet port, a solenoid valve in said conduit, a liquid level responsive switch responsive to the liquid level in the separating chamber controlling the energization of said solenoid valve, and a pressure maintaining valve in said conduit.

9. A refrigerant purging system comprising a plurality of sequentially arranged and serially interconnected treating chambers, means for serially passing gaseous refrigerant sequentially through said chambers, the first of said chambers including a plurality of baffles arranged transversely to the flow of gaseous material therethrough, the second of said chambers connected to receive the gaseous material passed through said first chamber, a quantity of desiccant material in said second chamber, and a separating chamber connected to receive the material passed through said second chamber, means for liquifying the refrigerant passing from said second chamber to said separating chamber, a liquid outlet port in the lower portion of said separating chamber, a conduit communicating with said outlet port, a solenoid valve in said conduit, a liquid level responsive switch controlling the energization of said solenoid valve, a gas outlet port in the upper portion of said separating chamber, a solenoid operated valve controlling said gas outlet port, a pressure responsive switch controlling the energization of said second mentioned solenoid operated valve.

10. A system for purging the refrigerant of a refrigerating system comprising a conduit adapted to receive gas under pressure from the refrigerating system, a first chamber in said conduit, a plurality of transverse baffles in said first chamber, a drain port in the lower portion of said first chamber, a quantity of water absorbent material in said conduit, a separating chamber communicated with said conduit, a refrigerating means enclosing a portion of said conduit, a liquid outlet port in the lower portion of said separating chamber, a second conduit communicating with said liquid outlet port, a solenoid operated valve in said second conduit, a float actuated switch responsive to the depth of liquid in said separating chamber for energizing said solenoid operated valve, said chambers and water absorbent material being arranged in series relation.

11. A system for purging the refrigerant of a refrigerating system comprising a conduit adapted to receive gas under pressure from the refrigerating system, a first chamber in said conduit, a plurality of transverse baffles in said first chamber, a drain port in the lower portion of said first chamber, a quantity of water absorbent material in said conduit, a separating chamber communicated with said conduit, a refrigerating means enclosing a portion of said conduit before it enters the separating chamber, a liquid outlet port in the lower portion of said separating chamber, a second conduit communicating with said liquid outlet port, a solenoid operated valve in said second conduit, a float actuated switch responsive to the depth of liquid in said separating chamber for energizing said solenoid operated valve, a gas outlet port adjacent the top of said separating chamber, a valve controlling said gas outlet port, pressure responsive means for actuating said last mentioned valve.

12. A refrigerant purging system comprising a separating chamber, a conduit adapted to communicate said separating chamber with a high pressure gaseous portion of a refrigerator system, means for refrigerating a portion of said conduit to liquify the refrigerant therein before it enters the separating chamber, a liquid outlet port in the lower portion of said separating chamber, a second conduit adapted to communicate said liquid outlet port with a low pressure portion of said refrigeration system, a valve in said second conduit, valve actuating means responsive to liquid level in said separating chamber for opening and closing said valve, a gas outlet port adjacent the top of said separating chamber, a valve in said gas outlet port, a pressure responsive valve actuating means controlling said last mentioned valve.

References Cited in the file of this patent

UNITED STATES PATENTS

| | | |
|---|---|---|
| 2,202,010 | Kondolp | May 28, 1940 |
| 2,400,620 | Zwickl | May 21, 1946 |
| 2,430,692 | Touberg | Nov. 11, 1947 |
| 2,464,631 | Zwickl | Mar. 15, 1949 |